(12) United States Patent
Chiu et al.

(10) Patent No.: US 9,939,014 B1
(45) Date of Patent: Apr. 10, 2018

(54) SLIDE RAIL DISPLACEMENT POSITIONING MECHANISM

(71) Applicant: Nan Juen International Co., Ltd., New Taipei (TW)

(72) Inventors: I-Hsiang Chiu, New Taipei (TW); Kevin Buana, New Taipei (TW)

(73) Assignee: Nan Juen International Co., Ltd., New Taipei (TW)

( * ) Notice: Subject to any disclaimer, the term of this patent is extended or adjusted under 35 U.S.C. 154(b) by 0 days.

(21) Appl. No.: 15/499,881

(22) Filed: May 9, 2017

(51) Int. Cl.
| | | |
|---|---|---|
| A47B 88/16 | (2006.01) | |
| F16C 29/10 | (2006.01) | |
| F16C 29/00 | (2006.01) | |
| F16C 29/02 | (2006.01) | |

(52) U.S. Cl.
CPC ............ *F16C 29/10* (2013.01); *F16C 29/005* (2013.01); *F16C 29/02* (2013.01)

(58) Field of Classification Search
CPC ........ F16C 29/005; F16C 29/02; F16C 29/10; A47B 88/40; A47B 88/483; A47B 88/49
See application file for complete search history.

(56) References Cited

U.S. PATENT DOCUMENTS

| | | | | | |
|---|---|---|---|---|---|
| 3,589,778 | A | * | 6/1971 | Olson | F16C 29/02 312/334.46 |
| 6,705,689 | B2 | * | 3/2004 | Chen | A47L 388/493 312/333 |
| 8,534,782 | B2 | * | 9/2013 | Yu | F16C 29/005 312/333 |
| 9,498,060 | B1 | * | 11/2016 | Hsu | A47L 388/467 |
| 2006/0120636 | A1 | * | 6/2006 | Chen | A47L 388/40 384/18 |
| 2012/0308297 | A1 | * | 12/2012 | Chen | A47L 388/49 403/109.2 |
| 2013/0058597 | A1 | * | 3/2013 | Chang | F16C 29/005 384/21 |
| 2013/0058598 | A1 | * | 3/2013 | Chang | F16C 29/005 384/41 |

FOREIGN PATENT DOCUMENTS

JP        2012130668 A    *   7/2012    ............ F16C 29/005

* cited by examiner

*Primary Examiner* — Phillip A Johnson (57) ABSTRACT

A slide rail displacement positioning mechanism includes a slide rail assembly consisting of an inner slide rail and an outer slide rail, a stopper member affixed to the inner slide rail and providing a positioning gap between a frame body and an abutment component thereof, and a positioning member affixed to the outer slide rail and adapted for elastically biasing the abutment component upon a relative movement between the stopper member and the positioning member subject to the operation of the slide rail assembly, and thus, the positioning member can be positively stopped by the frame body to achieve relative positioning between the outer slide rail and inner slide rail of the slide rail assembly.

3 Claims, 10 Drawing Sheets

SLIDE RAIL DISPLACEMENT POSITIONING MECHANISM

BACKGROUND OF THE INVENTION

1. Field of the Invention

The present invention relates to sliding rail technology and more particularly to a slide rail displacement positioning mechanism, which utilizes an elastically restorable stopper member to limit the sliding movement of the slide rail assembly and to control the positioning of the inner and outer slide rails of the slide rail assembly.

2. Description of the Related Art

In order for enabling a slide rail assembly to be positively positioned in position when the inner slide rail is pulled out of the outer slide rail to the desired extent, a shrapnel is provided at the outer slide rail of the slide rail assembly so that the inner slide rail can be positively positioned in a groove in the shrapnel after having been pulled out of the outer slide rail for a distance. However, if the inner slide rail is pulled out of the outer slide rail in a rush, the inner slide rail will be moved over the groove of the shrapnel and not be positively positioned in the desired position.

SUMMARY OF THE INVENTION

The present invention has been accomplished under the circumstances in view. It is therefore the main object of the present invention to provide a slide rail displacement positioning mechanism, which provides a positioning gap in between a frame body of a stopper member that is affixed to an inner slide rail of a slide rail assembly and an abutment component, enabling the abutment component to be biased upon movement of a positioning member that is affixed to an outer slide rail of the slide rail assembly, ensuring positive positioning of the inner slide rail relative to the outer slide rail.

It is another object of the present invention to provide a slide rail displacement positioning mechanism, which can force the abutment component to release the constraint from the positioning member when the frame body of the stopper member is pressed by an external force, facilitating ease of use.

To achieve these and other objects of the present invention, a slide rail displacement positioning mechanism comprises a slide rail assembly, a stopper member and a positioning member. The slide rail assembly comprises an outer slide rail, and an inner slide rail axially slidably coupled to and movable in and out of the outer slide rail. The stopper member comprises a frame body and an abutment component. The frame body comprises a front mounting end portion affixed to the inner slide rail of the slide rail assembly, an opposing rear abutment end portion, and two elastically restorable springy arms bilaterally connected between the front mounting end portion and the rear abutment end portion. The abutment component comprises a rear connection end connected to the front mounting end portion of the frame body, and an opposing front abutment end extending toward the rear abutment end portion of the frame body and spaced from the rear abutment end portion by a positioning gap. The positioning member is affixed to the outer slide rail of the slide rail assembly, comprising a mounting base and two protruded positioning portions respectively perpendicularly extended from two opposite lateral sides of the mounting base and aimed at the abutment component of the stopper member. Thus, when the inner slide rail is pulled out of the outer slide rail, the protruded positioning portions are pressed on the abutment component to elastically bias the abutment component for allowing the protruded positioning portions to enter the positioning gap in the stopper member. After the protruded positioning portions entered the positioning gap, the abutment component immediately returns to its previous position subject to the elastic restoring energy thereof, and thus, the protruded positioning portions are positively positioned in between the rear abutment end portion of the frame body and the front abutment end of the abutment component.

DETAILED DESCRIPTION OF THE PREFERRED EMBODIMENT

Referring to FIGS. 1-5, a slide rail displacement positioning mechanism in accordance with the present invention is shown. The slide rail displacement positioning mechanism comprises a slide rail assembly 1, stopper member 2 and a positioning member 3.

The slide rail assembly 1 comprises an inner slide rail 11 and an outer slide rail 12. The outer slide rail 12 is attached onto the inner slide rail 11, allowing the inner slide rail 11 to be axially moved in and out of the outer slide rail 12.

The stopper member 2 is made of a one piece plate member using stamping technology, comprising a frame body 21, and an abutment component 22. The frame body 21 comprises a front mounting end portion 211, an opposing rear abutment end portion 212, and two elastically restorable springy arms 213 bilaterally connected between the front mounting end portion 211 and the rear abutment end portion 212. The abutment component 22 has a rear connection end 221 and an opposing front abutment end 222. The rear connection end 221 is connected to the front mounting end portion 211 of the frame body 21. The front abutment end 222 extends toward the rear abutment end portion 212, and is spaced from the rear abutment end portion 212 by a positioning gap 23. The frame body 21 of the stopper member 2 further comprises two pressure arms 214 respectively transversely extended from the springy arms 213 and respectively laterally abutted against the abutment component 22 between the front mounting end portion 211 and the rear abutment end portion 212. Further, the abutment component 22 has two opposing side notches 223 for accommodating the distal ends of the pressure arms 214.

The positioning member 3 comprises a mounting base 31, and two protruded positioning portions 32 respectively perpendicularly extended from two opposite lateral sides of the mounting base 31.

The frame body 21 of the stopper member 2 further comprises a plurality of mounting through holes 215 cut through the front mounting end portion 211. The inner slide rail 11 of the slide rail assembly 1 comprises a plurality of mounting rods 111 respectively riveted to the mounting through holes 215. The frame body 21 of the stopper member 2 further comprises a position-limiting lug 216 extended from one side of the rear abutment end portion 212 opposite to the positioning gap 23. The inner slide rail 11 further comprises an abutment lug 112 facing toward the mounting rods 111. The position-limiting lug 216 is disposed at the bottom side relative to the abutment lug 112. Further, the mounting base 31 of the positioning member 3 is affixed to the outer slide rail 12 of the slide rail assembly 1, keeping the protruded positioning portions 32 to aim at the abutment component 22 of the stopper member 2.

Figure 1:
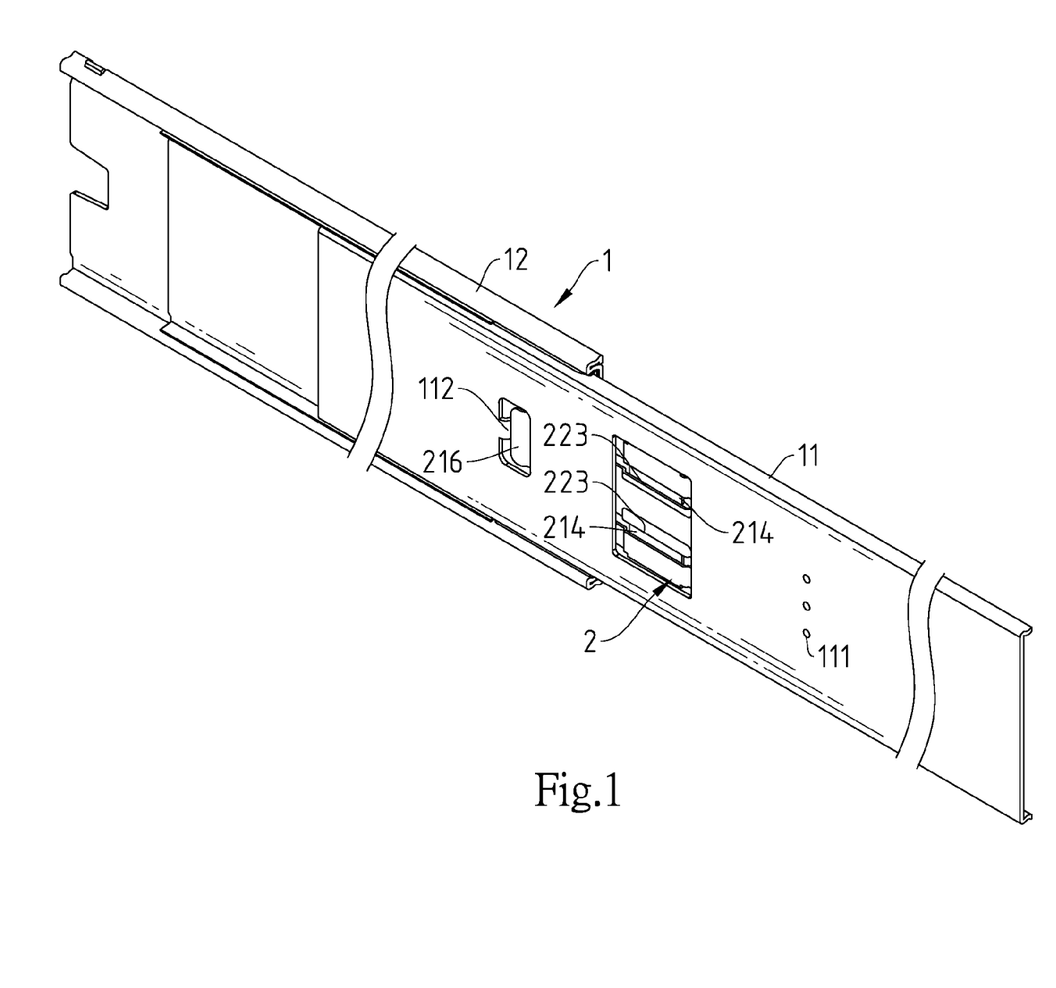
FIG. 1 is an oblique top elevational view of a slide rail displacement positioning mechanism in accordance with the present invention.
Figure 2:
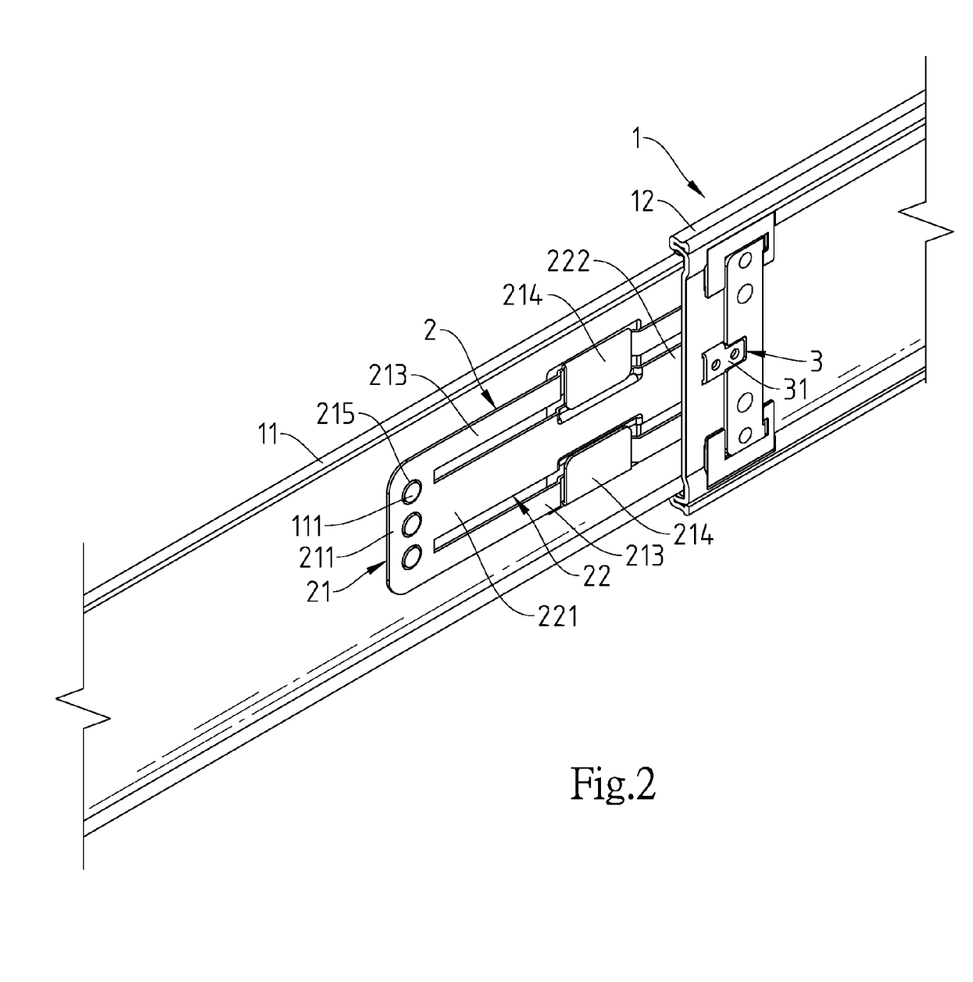
FIG. 2 corresponds to FIG. 1 when viewed from another angle.
Figure 3:
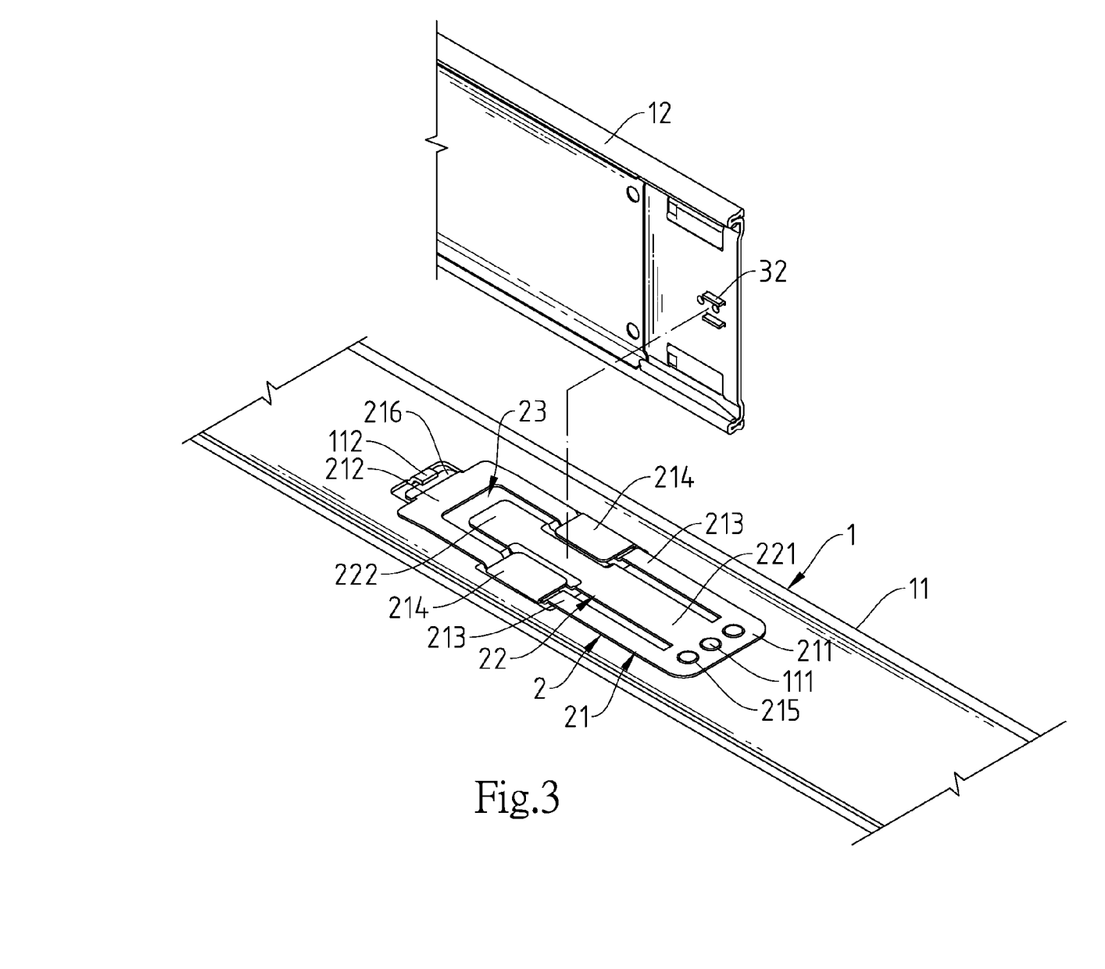
FIG. 3 is an exploded view of the slide rail assembly of the slide rail displacement positioning mechanism in accordance with the present invention.
Figure 4:
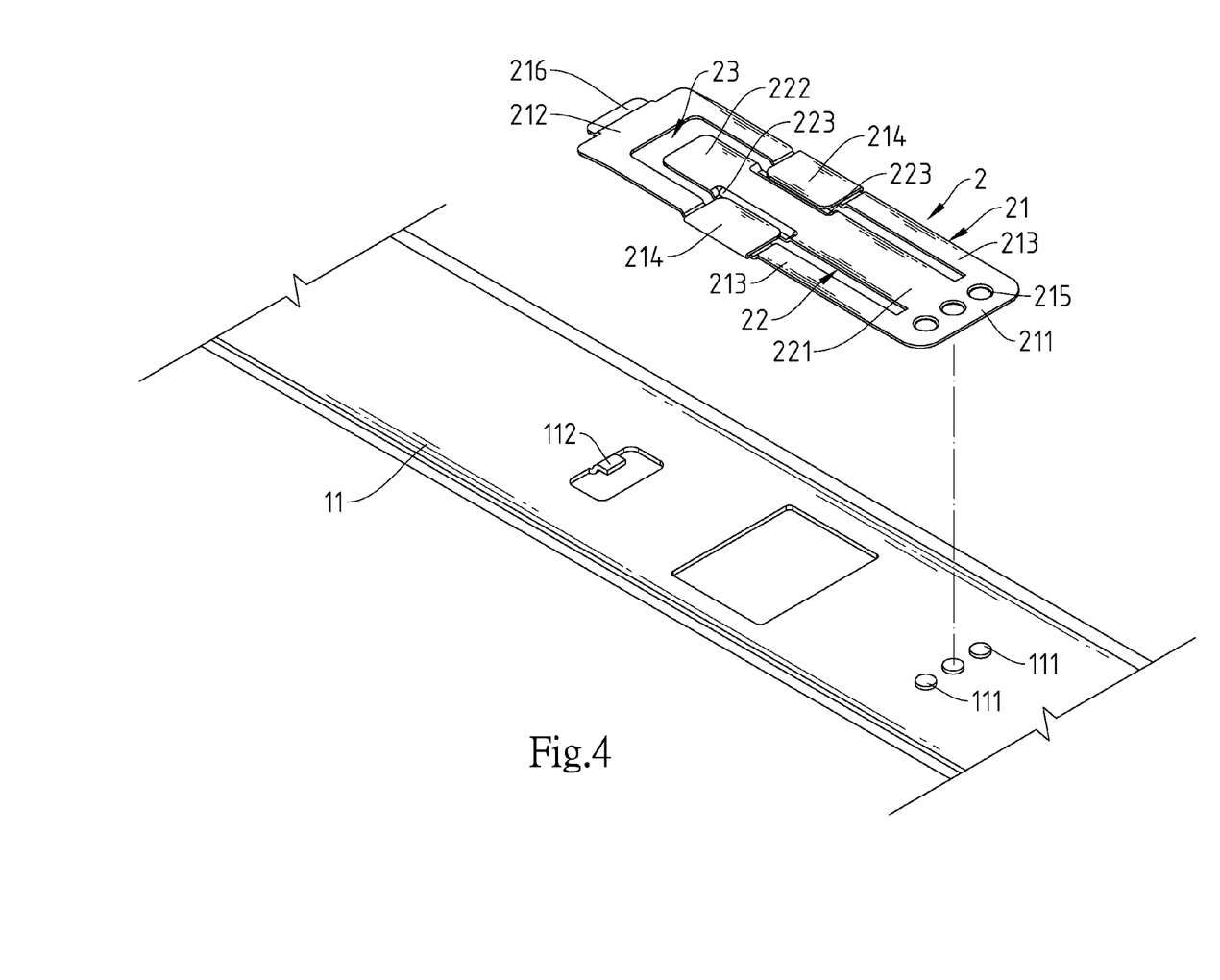
FIG. 4 is an exploded view of the stopper member and inner slide rail of the slide rail displacement positioning mechanism in accordance with the present invention.
Figure 5:
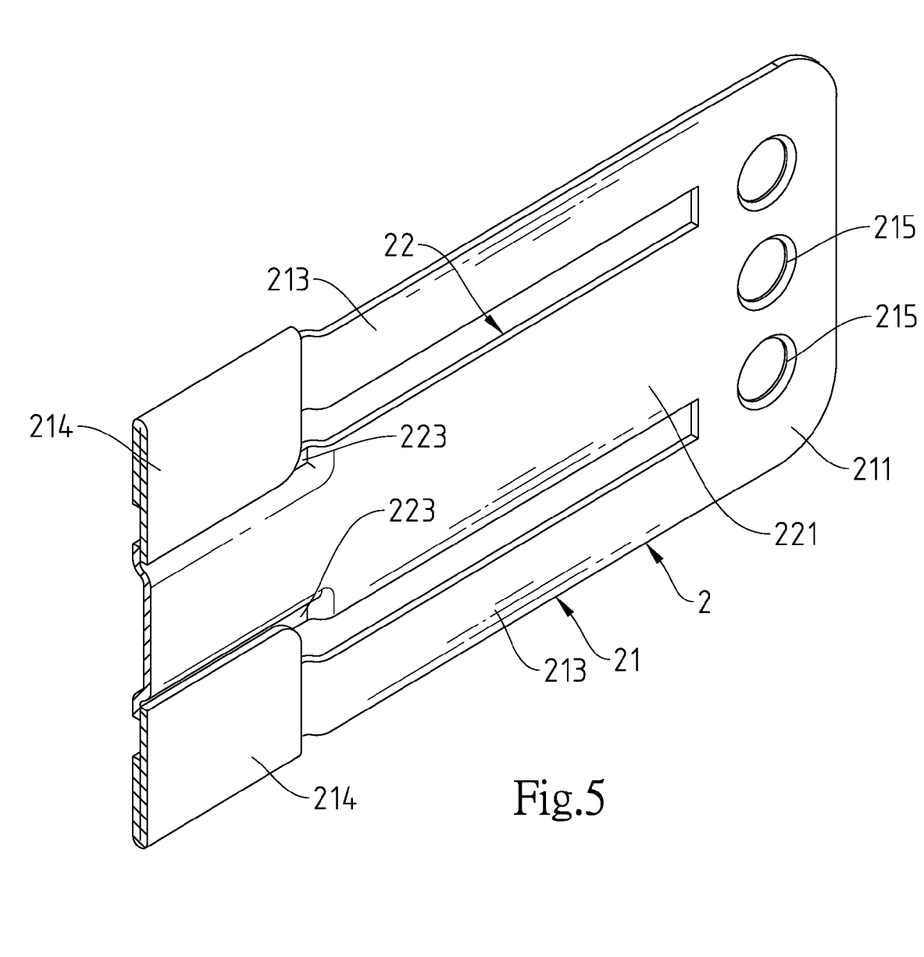
FIG. 5 is a sectional elevation of the stopper member of the slide rail displacement positioning mechanism in accordance with the present invention.
Figure 6:
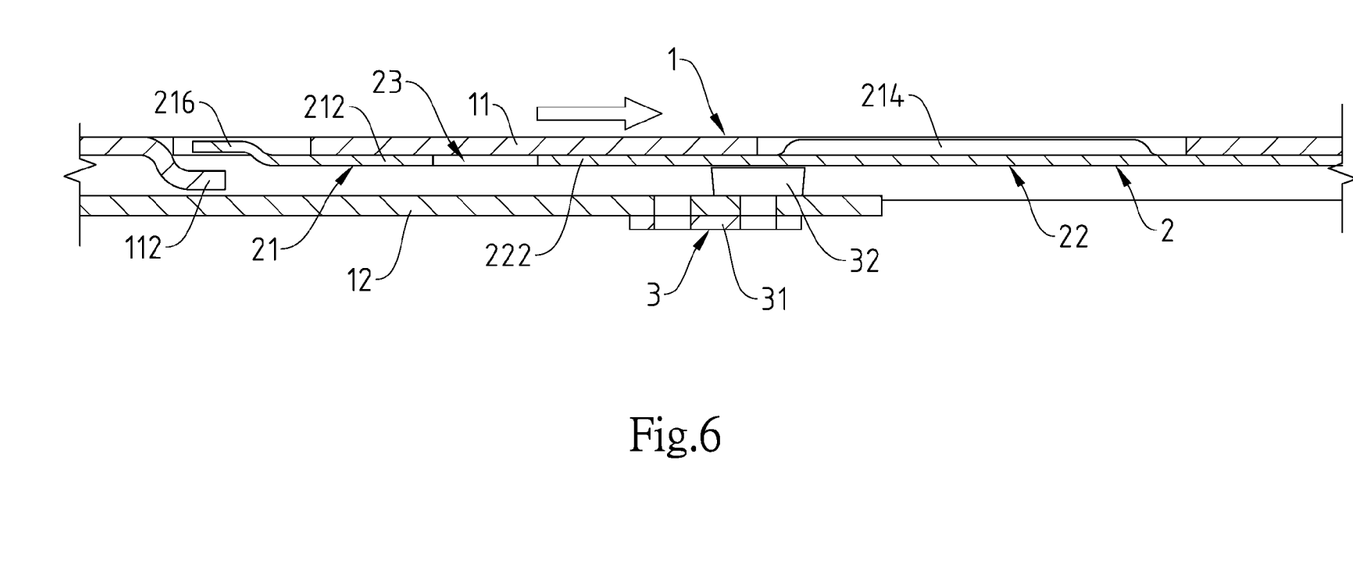
FIG. 6 is a schematic sectional side view of the present invention, illustrating the inner slide rail moved out of the outer slide rail.
Figure 7:
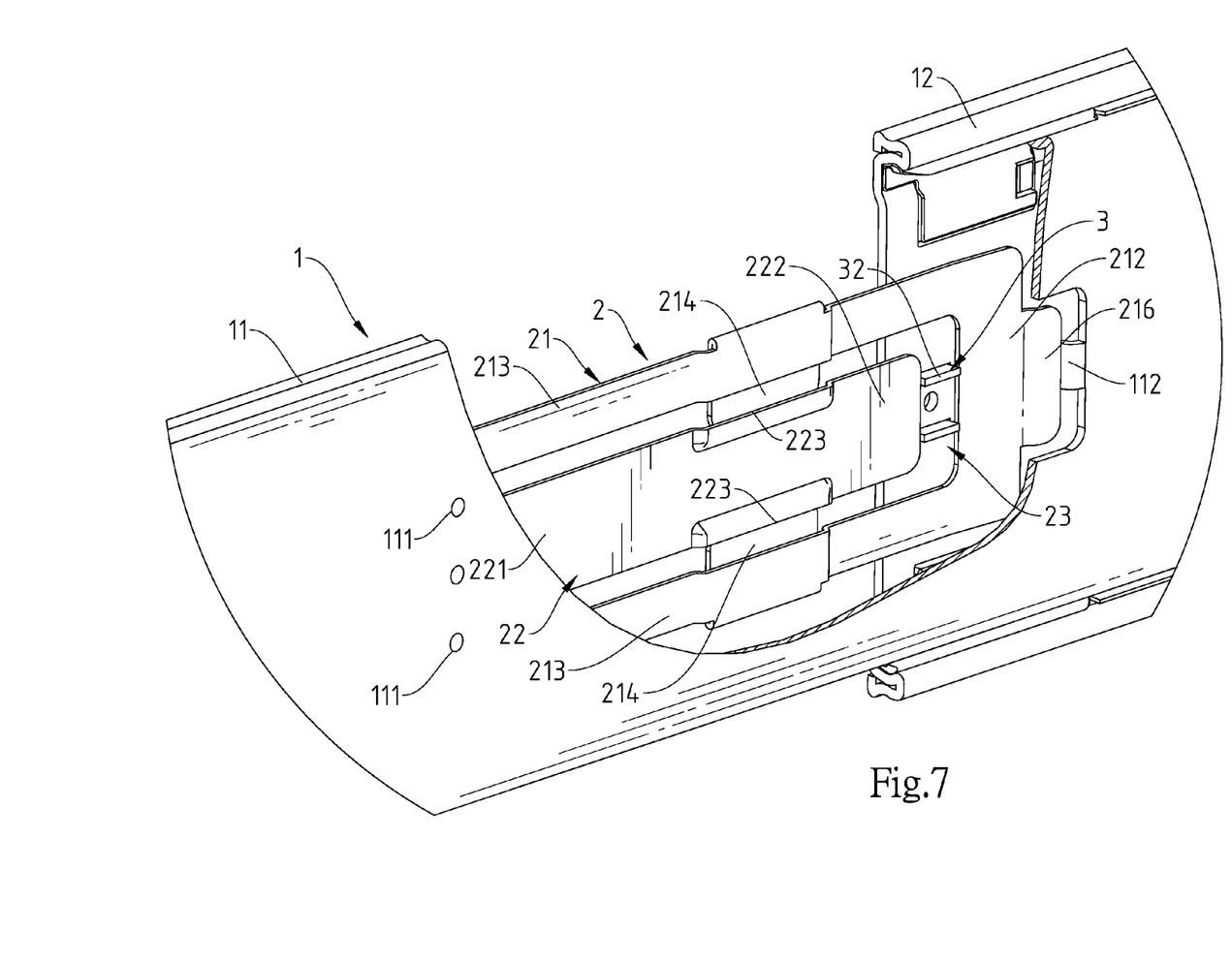
FIG. 7 is a schematic sectional elevation of the present invention, illustrating the stopper member and the positioning member set in position
Figure 8:
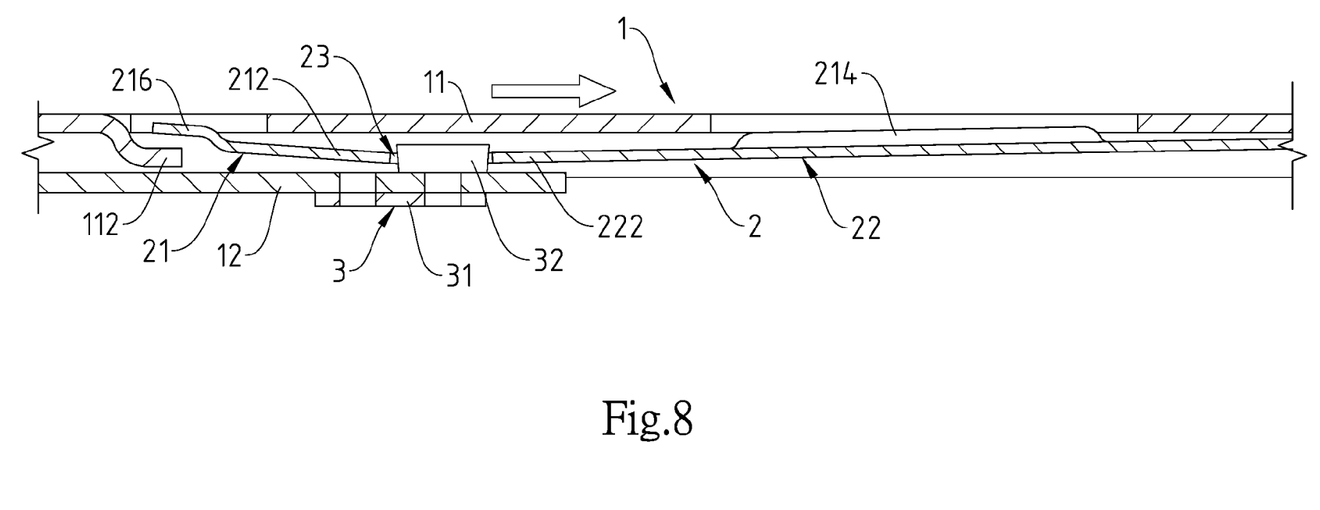
FIG. 8 is a schematic sectional view of the present invention, illustrating the stopper member positioned relative to the positioning member set.
Figure 9:
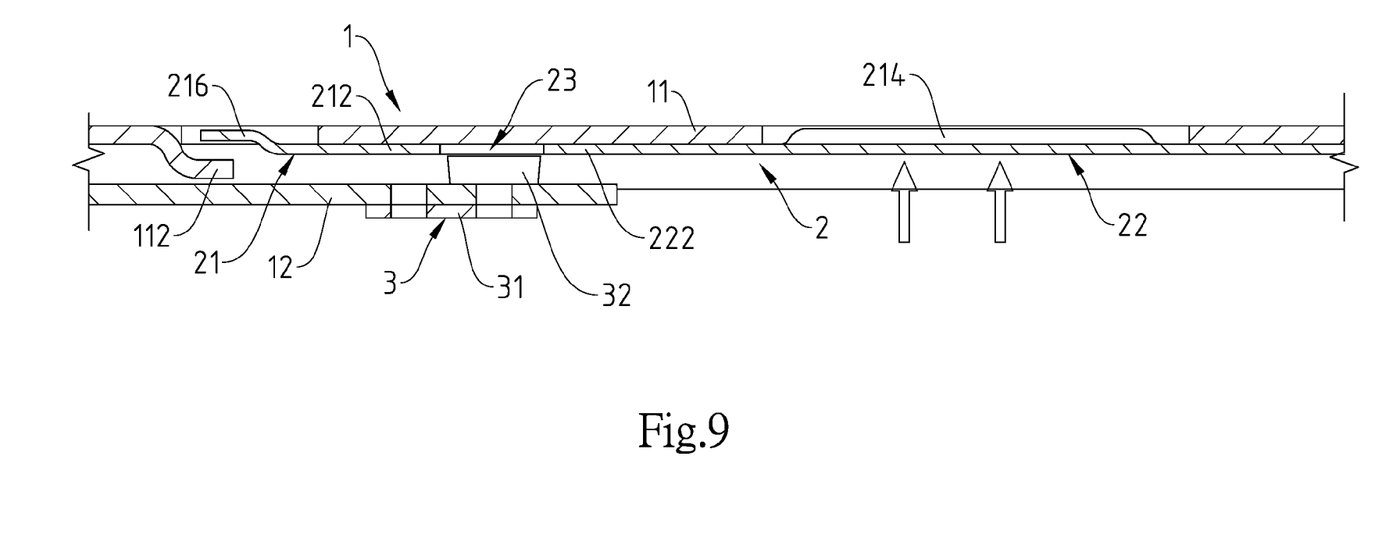
FIG. 9 is a schematic sectional view of the present invention, illustrating the stopper member released from the constraint of the positioning member.
Figure 10:
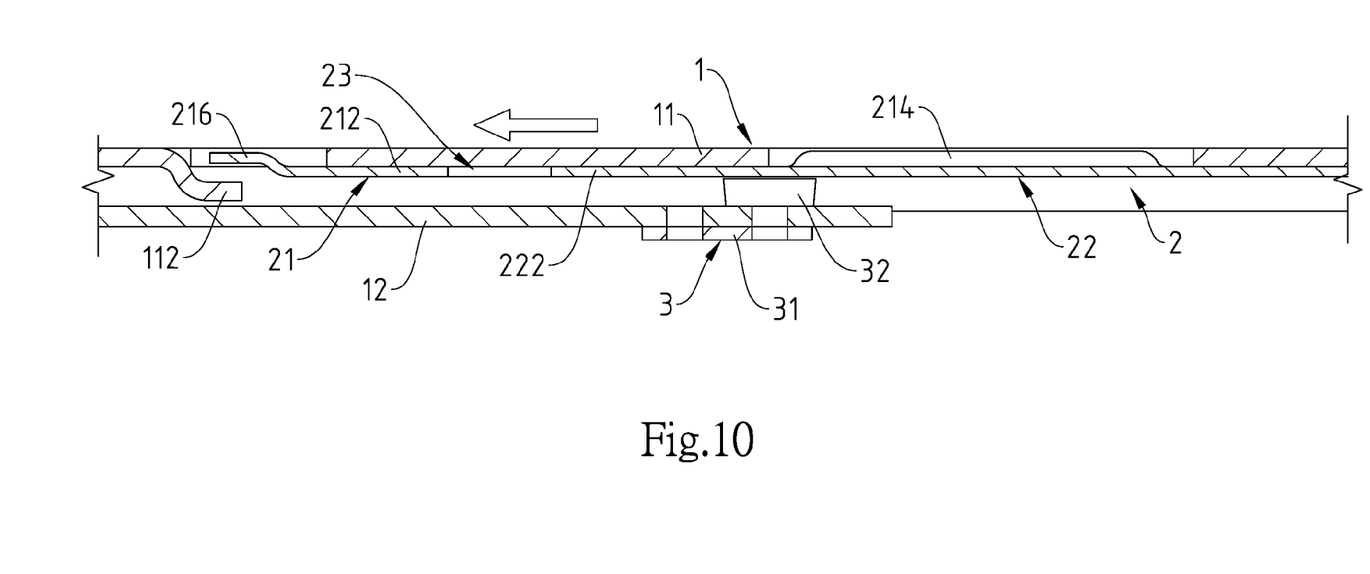
FIG. 10 is a schematic sectional view of the present invention, illustrating the inner slide rail moved toward the inside of the outer slide rail.

Referring to FIGS. 5-10 and more particularly FIGS. 6-8, when the inner slide rail 11 is being pulled out of the outer slide rail 12, the stopper member 2 and the positioning member 3 are moving toward each other subject to the relative movement between the inner slide rail 11 and the outer slide rail 12. At this time, the protruded positioning portions 32 of the positioning member 3 will be pressed on the abutment component 22 to elastically bias the abutment component 22 toward the surface of the inner slide rail 11. After the protruded positioning portions 32 enter the positioning gap 23 of the stopper member 2, the abutment component 22 immediately returns to its previous position subject to the effect of the elastic restoring energy thereof, achieving positioning of the protruded positioning portions 32 between the rear abutment end portion 212 of the frame body 21 and the front abutment end 222 of the abutment component 22. Since the frame body 21 is prohibited from moving toward the surface of the inner slide rail 11 when the protruded positioning portions 32 are pressed on the abutment component 22, the protruded positioning portions 32 can be positively stopped by the rear abutment end portion 212. As illustrated in FIGS. 9 and 10, when going to release the relative positioning condition between the inner slide rail 11 and outer slide rail 12 of the slide rail assembly 1, press the pressure arms 214 to simultaneously force the rear abutment end portion 212 of the frame body 21 and the front abutment end 222 of the abutment component 22 toward the inner slide rail 11, releasing the positioning member 3 from the frame body 21 and allowing sliding movement of the inner slide rail 11 of the slide rail assembly 1 relative to the outer slide rail 12.

What the invention claimed is:

1. A slide rail displacement positioning mechanism, comprising:
   a slide rail assembly comprising an outer slide rail and an inner slide rail axially slidably coupled to and movable in and out of said outer slide rail;
   a stopper member comprising a frame body and an abutment component, said frame body comprising a front mounting end portion affixed to said inner slide rail of said slide rail assembly, an opposing rear abutment end portion and two elastically restorable springy arms bilaterally connected between said front mounting end portion and said rear abutment end portion, said abutment component comprising a rear connection end connected to said front mounting end portion of said frame body and an opposing front abutment end extending toward said rear abutment end portion of said frame body and spaced from said rear abutment end portion by a positioning gap; and
   a positioning member affixed to said outer slide rail of said slide rail assembly, said positioning member comprising a mounting base and two protruded positioning portions respectively perpendicularly extended from two opposite lateral sides of said mounting base and aimed at said abutment component of said stopper member;
   wherein when said inner slide rail is pulled out of said outer slide rail, said protruded positioning portions are pressed on said abutment component to elastically bias said abutment component for allowing said protruded positioning portions to enter said positioning gap in said stopper member and then to return to the previous position thereof subject to an elastic restoring energy thereof after said protruded positioning portions enter said positioning gap, and thus, said protruded positioning portions are positively positioned in between said rear abutment end portion of said frame body and said front abutment end of said abutment component.

2. The slide rail displacement positioning mechanism as claimed in claim 1, wherein said stopper member is a one-piece member, further comprising two pressure arms respectively transversely extended from said springy arms and respectively laterally abutted against said abutment component between said front mounting end portion and said rear abutment end portion so that when said pressure arm is pressed by an external force, said frame body and said abutment component are simultaneously moved toward said inner slide rail, releasing said positioning member from said frame body and allowing sliding movement of said inner slide rail of said slide rail assembly relative to said outer slide rail.

3. The slide rail displacement positioning mechanism as claimed in claim 2, wherein said abutment component further comprises two opposing side notches disposed between said front mounting end portion and said rear abutment end portion for accommodating respective distal ends of said pressure arms.

\* \* \* \* \*